US012160100B2

(12) United States Patent
Yuan et al.

(10) Patent No.: US 12,160,100 B2
(45) Date of Patent: Dec. 3, 2024

(54) METHOD AND APPARATUS FOR PHOTOVOLTAIC DC DIRECT-FED POWER GENERATION

(71) Applicants: STATE GRID JIANGSU ELECTRIC POWER COMPANY RESEARCH INSTITUTE, Nanjing (CN); STATE GRID JIANGSU ELECTRIC POWER CO., LTD., Nanjing (CN); JIANGSU ELECTRIC POWER RESEARCH INSTITUTE CO., LTD., Nanjing (CN)

(72) Inventors: Yubo Yuan, Nanjing (CN); Xuefeng Ge, Nanjing (CN); Chenyu Zhang, Nanjing (CN); Mingming Shi, Nanjing (CN); Xiaodong Yuan, Nanjing (CN); Qi Zhou, Nanjing (CN); Jinggang Yang, Nanjing (CN); Ye Chen, Nanjing (CN)

(73) Assignees: STATE GRID JIANGSU ELECTRIC POWER COMPANY RESEARCH INSTITUTE, Nanjing (CN); STATE GRID JIANGSU ELECTRIC POWER CO., LTD., Nanjing (CN); JIANGSU ELECTRIC POWER RESEARCH INSTITUTE CO., LTD., Nanjing (CN)

( * ) Notice: Subject to any disclaimer, the term of this patent is extended or adjusted under 35 U.S.C. 154(b) by 16 days.

(21) Appl. No.: 18/019,475

(22) PCT Filed: Jun. 26, 2021

(86) PCT No.: PCT/CN2021/102568
§ 371 (c)(1),
(2) Date: Feb. 2, 2023

(87) PCT Pub. No.: WO2022/057363
PCT Pub. Date: Mar. 24, 2022

(65) Prior Publication Data
US 2023/0283070 A1    Sep. 7, 2023

(30) Foreign Application Priority Data
Sep. 15, 2020    (CN) .......................... 202010965747.6

(51) Int. Cl.
*H02J 1/10*        (2006.01)
*G05F 1/67*        (2006.01)
(Continued)

(52) U.S. Cl.
CPC .................. *H02J 1/10* (2013.01); *G05F 1/67* (2013.01); *H02J 7/35* (2013.01); *H02S 10/10* (2014.12); *H02J 2300/26* (2020.01)

(58) Field of Classification Search
CPC ............ H02J 1/10; H02J 3/32; H02J 3/02021; H02S 10/10
See application file for complete search history.

(56) References Cited

U.S. PATENT DOCUMENTS

| 10,992,139 | B1* | 4/2021 | Dibachi | .................. H02J 3/381 |
| 2010/0156185 | A1* | 6/2010 | Kim | .......................... H02J 3/46 307/82 |

(Continued)

FOREIGN PATENT DOCUMENTS

| CN | 102427230 A | 4/2012 |
| CN | 103545907 A | 1/2014 |

(Continued)

*Primary Examiner* — Adi Amrany
(74) *Attorney, Agent, or Firm* — SZDC Law PC

(57) ABSTRACT

The present invention discloses a method and apparatus for photovoltaic DC direct-fed power generation based on controllable power supply. According to the present invention, the photovoltaic cells are directly connected to the DC microgrid, and the DC bus voltage is flexibly regulated by the controllable power supply in the DC microgrid to enable (Continued)

the photovoltaic cells to operate at the maximum power, thus eliminating the need for a DC interface converter when the photovoltaic cells are connected to the DC bus and reducing the cost and size of the distributed PV power generation system.

3 Claims, 3 Drawing Sheets

(51) Int. Cl.
  *H02J 7/35* (2006.01)
  *H02S 10/10* (2014.01)

(56) References Cited

U.S. PATENT DOCUMENTS

| | | | | |
|---|---|---|---|---|
| 2010/0231045 | A1* | 9/2010 | Collins | H02J 7/35 307/47 |
| 2011/0273130 | A1* | 11/2011 | Lee | H02S 40/32 320/101 |
| 2015/0295412 | A1* | 10/2015 | Schiffmann | H02J 3/381 307/31 |
| 2022/0121260 | A1* | 4/2022 | King | G06F 1/28 |

FOREIGN PATENT DOCUMENTS

| | | |
|---|---|---|
| CN | 104348235 A | 2/2015 |
| CN | 106786490 A | 5/2017 |
| CN | 112366676 A | 2/2021 |
| JP | 2016001935 A | 1/2016 |
| JP | 2019083635 A | 5/2019 |

\* cited by examiner

METHOD AND APPARATUS FOR PHOTOVOLTAIC DC DIRECT-FED POWER GENERATION This application is the National Stage Application of PCT/CN2021/102568, filed on Jun. 26, 2021, which claims priority to Chinese Patent Application No. 202010965747.6, filed on Sep. 15, 2020, which is incorporated by reference for all purposes as if fully set forth herein.

TECHNICAL FIELD

The present invention relates to the field of power electronic automatic control and in particular relates to a method and apparatus for photovoltaic DC direct-fed power generation based on controllable power supply.

BACKGROUND

With the depletion of fossil energy, the extensive use of renewable energy sources such as solar photovoltaic (PV) is an important step to solve the energy crisis. In the past few years, China has introduced a series of strong and effective measures such as feed-in tariff (FIT), and the feed-in proportion of distributed PV in the distribution network has grown explosively. However, with the disappearance of the FIT dividend, the momentum of distributed PV growth has weakened. The main factors affecting the feed-in of new distributed PV are the size, cost and power generation efficiency of the equipment. The size of the interface converter of distributed PV is large, preventing some users sensitive to the size factor from choosing to install distributed PV. The installation cost and power generation efficiency of the interface converter of distributed PV affect the cost recovery of users. Along with the disappearance of the FIT dividend, the cost and efficiency of the interface converter of PV significantly affect the growth of distributed PV.

SUMMARY

It is an object of the present invention to provide a method and apparatus for photovoltaic DC direct-fed power generation based on controllable power supply to improve the conversion efficiency of distributed PV.

A method for photovoltaic DC direct-fed power generation based on controllable power supply, comprises the following steps:

1) measuring the output voltage and output current of the controllable power supply, and calculating the output power of the controllable power supply;
2) controlling a power generation apparatus based on a maximum power tracking control mode; and
3) cyclically switching the controllable power source between the maximum power tracking control mode and a voltage control mode.

In the step 1), the output power $P_{CD}(k)$ of the controllable power supply at time k is calculated according to the following equation:

$$P_{CD}(k) = V_{bus}(k) I_{cd}(k)$$

where $V_{bus}(k)$ and $I_{cd}(k)$ represent the output voltage and output current of the controllable power supply at time k, respectively.

In the step 2), it is first determined whether the following inequality holds or not:

$$P_{CD}(k+1) - P_{CD}(k) < 2\frac{\Delta V V_{bus}}{R_L}$$

where $P_{CD}(k+1)$ and $P_{CD}(k)$ represent the output power of the controllable power supply at time k+1 and k, respectively, $\Delta V$ represents the variation of DC bus voltage, and $R_L$ represents the total power of the DC micro-grid load.

If the preceding inequality holds, it is further determined whether the following inequality holds or not:

$$V_{bus}(k+1+) > V_{bus}(k)$$

where $V_{bus}(k+1)$ and $V_{bus}(k)$ represent the output voltage of the controllable power supply at time k+1 and k, respectively; if the inequality holds, the output voltage of the controllable power supply increases by one step, otherwise, the output voltage of the controllable power supply decreases by one step.

In the step 2), it is first determined whether the following inequality holds or not:

$$P_{CD}(k+1) - P_{CD}(k) < 2\frac{\Delta V V_{bus}}{R_L}$$

where $P_{CD}(k+1)$ and $P_{CD}(k)$ represent the output power of the controllable power supply at time k+1 and k, respectively, $\Delta V$ represents the variation of DC bus voltage, and $R_L$ represents the total power of the DC micro-grid load.

If the preceding inequality does not hold, it is further determined whether the following inequality holds or not:

$$V_{bus}(k+1I) > V_{bus}(k)$$

where $V_{bus}(k+1)$ and $V_{bus}(k)$ represent the output voltage of the controllable power supply at time k+1 and k, respectively; if the inequality holds, the output voltage of the controllable power supply decreases by one step, otherwise, the output voltage of the controllable power supply increases by one step.

In the step 3), the controllable power supply switches to voltage control mode after the maximum power tracking control mode runs for a period of time $\Delta T$, then switches back to the maximum power tracking control mode after the voltage control mode runs for a period of time T, and so on.

An apparatus for photovoltaic DC direct-fed power generation based on controllable power supply comprises a DC bus connected to a DC load, wherein a photovoltaic cell is directly connected to the DC bus, and wherein the controllable power source is connected to the DC bus through an interface converter.

The controllable power supply is a continuously adjustable power supply with active power output.

The advantage of the invention is that the photovoltaic cells are directly connected to the DC microgrid, and the DC bus voltage is flexibly regulated by the controllable power supply in the DC microgrid to enable the photovoltaic cells to operate at the maximum power, thus eliminating the need for a DC interface converter when the photovoltaic cells are connected to the DC bus and reducing the cost and size of the distributed PV power generation system.

DESCRIPTION OF THE EMBODIMENTS

Figure 1:
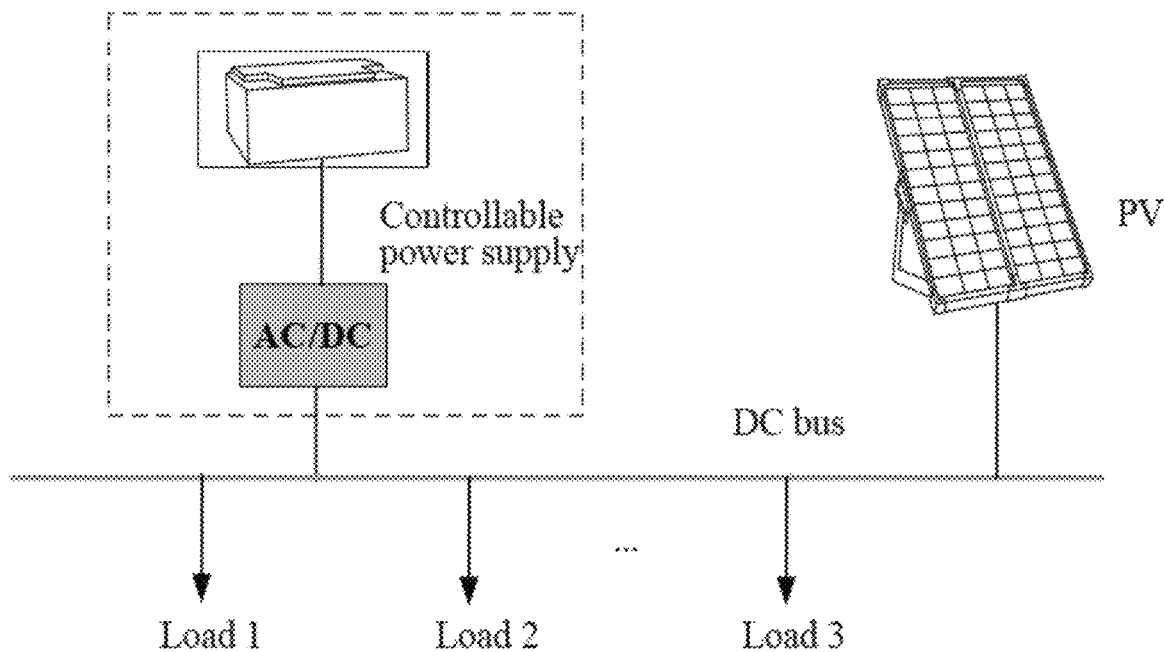
FIG. 1 illustrates the photovoltaic direct-fed DC power generation apparatus according to the present invention.

A block diagram of the structure of the photovoltaic DC direct-fed power generation apparatus of an embodiment is shown in FIG. 1, where the PV cells are directly connected to the DC bus in the DC micro-grid, and the DC micro-grid keeps running off-grid and is not connected to the conventional AC grid. In addition to the PV cells, the DC microgrid contains a large capacity controllable power supply and a DC load. The controllable power supply is defined as a continuously adjustable power supply with active power output, such as an energy storage power supply. Generally, in the method for photovoltaic DC direct-fed power generation based on controllable power supply according to this embodiment, the controlled power supply is connected to the DC bus through a DC/DC or AC/DC interface converter and operates in voltage control mode.

Figure 2:
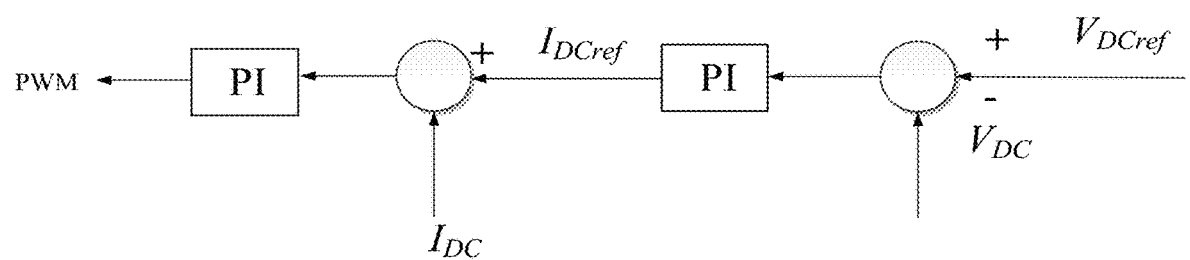
FIG. 2 illustrates the voltage control mode of the controllable power supply according to the present invention.

Since this embodiment omits the DC interface converter required to connect the PV cells to the DC bus, it is necessary to adjust the DC bus voltage using the controllable power supply. The voltage control mode of the controllable power supply is shown in FIG. 2. The overall control block diagram includes two levels of control: a voltage outer loop and a current inner loop, where the difference between a reference value $V_{DCref}$ of the bus voltage of the voltage outer loop and the measured value $I_{DCref}$ of the DC bus voltage is calculated and then processed by a PI regulator to generate an output current reference value $I_{DCref}$ of the controllable power supply; further, the difference between a reference current value $I_{DCref}$ and the measured current $I_{DC}$ is calculated and then processed by a PI regulator to generate a pulse width modulation (PWM) signal of the AC/DC interface converter.

The DC load in DC micro network includes a constant power load and a constant resistance load. The output power $P_{CP}$ of the constant power load is a constant value, independent of the DC bus voltage.

The output power $P_{CR}$ of constant resistance load is:

$$P_{CR} = \frac{V_{bus}^2}{R_L} \tag{1}$$

The total power $P_{TL}$ of DC microgrid load is:

$$P_{TL} = \frac{V_{bus}^2}{R_L} + P_{CP} \tag{2}$$

Therefore, the power balance expression of DC microgrid is:

$$P_{TL} = P_{TP} + P_{CD} \tag{3}$$

In the above equation $P_{CD}$ represents the output power of the controllable power and $P_{TP}$ represents the PV output power, the PV output power $P_{TP}$ can also be expressed as:

$$P_{TP} = V_{PV} I_{PV} \tag{4}$$

In the above equation, $V_{PV}$ and $I_{PV}$ represent the PV cell output voltage and current respectively. As the PV cell is directly connected to the DC bus, the PV cell output voltage is equal to the DC bus voltage $V_{bus}$. The PV cell is a controlled current source. When the light is constant, the magnitude of PV cell output current $I_{PV}$ is related to the PV cell output voltage $V_{PV}$, that is, related to the DC bus voltage $V_{bus}$. It can be seen that by controlling the DC bus voltage $V_{bus}$ through the controllable power supply, the maximum power tracking of the PV cell can be achieved based on the MPPT.

Let the PV cell output voltage and current at time k be $V_{PV}(k)$ and $I_{PV}(k)$, respectively, then the PV output power $P_{TP}(k)$ at time k is:

$$P_{TP}(k) = V_{PV}(k) I_{PV}(k) \tag{5}$$

The output voltage and output current of the controllable power supply are $V_{bus}(k)$ and $I_{cd}(k)$ respectively, wherein $V_{bus}(k)$ and $I_{cd}(k)$ can be obtained by measurement, then the output power $P_{CD}(k)$ of the controllable power supply at time k is:

$$P_{CD}(k) = V_{bus}(k) I_{cd}(k) \tag{6}$$

Then the system power balance equation at time k is:

$$P_{TL}(k) = P_{TP}(k) + P_{CD}(k) \tag{7}$$

If the variation of the DC bus voltage at time k+1 is $\Delta V$, that is:

$$V_{bus}(k+1) = V_{bus}(k) + \Delta V \tag{8}$$

In the above equation, $V_{bus}(k+1)$ represents the output voltage of the controllable power supply at time k+1, then the total power $P_{TL}(k+1)$ of the DC microgrid load at time k+1 is:

$$P_{TL}(k+1) = P_{TL}(k) + 2\frac{\Delta V V_{bus} + (\Delta V)^2}{R_L} \approx P_{TL}(k) + 2\frac{\Delta V V_{bus}}{R_L} \tag{9}$$

Similarly, the system power balance equation at time k+1 is:

$$P_{TL}(k+1) = P_{TP}(k+1) + P_{CD}(k+1) \tag{10}$$

From equations (7)-(9) it can be deduced as:

$$P_{TP}(k+1) - P_{TP}(k) = -[P_{CD}(k+1) - P_{CD}(k)] + 2\frac{\Delta V V_{bus}}{R_L} \tag{11}$$

If $P_{TP}(k+1) > P_{TP}(k)$, we have:

$$P_{CD}(k+1) - P_{CD}(k) < 2\frac{\Delta V V_{bus}}{R_L} \tag{12}$$

Figure 3:
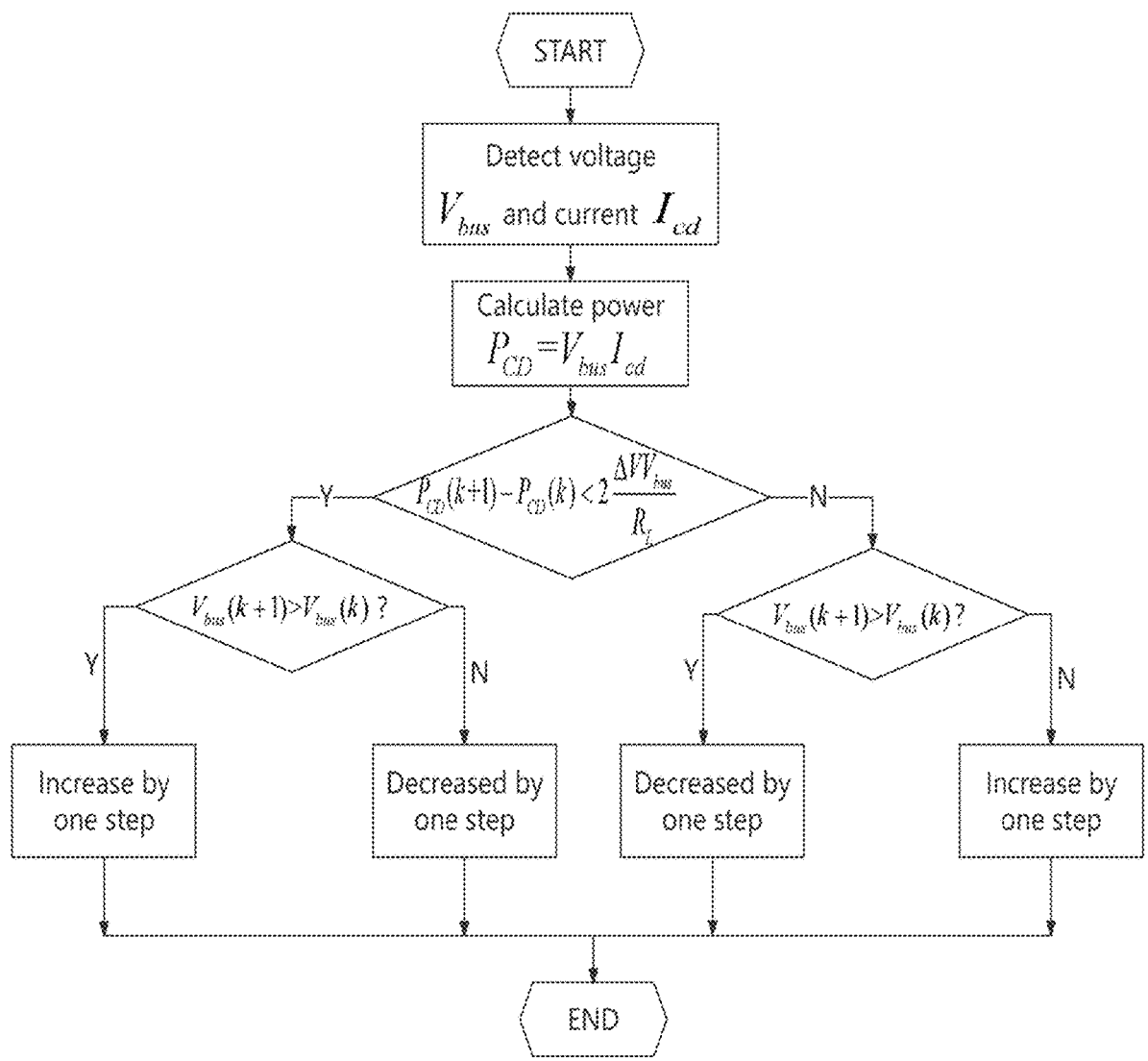
FIG. 3 is a flow chart of the maximum power tracking algorithm according to the present invention.

FIG. 3 illustrates the algorithm flow of the MPPT control method for a photovoltaic DC direct-fed system based on the controllable power supply. If the inequality (12) holds, then $P_{TP}(k+1) > P_{TP}(k)$.

Further if $V_{bus}(k+1) > V_{bus}(k)$ holds, then:

$$V_{bus}(k+2) = V_{bus}(k+1) + V_{bc} \tag{13}$$

that is, it ends after adding a fixed step $V_{bc}$ to the output voltage $V_{bus}(k+1)$ of the controllable power supply at time k+1.

If $V_{bus}(k+1) > V_{bus}(k)$ does not hold, then:

$$V_{bus}(k+2) = V_{bus}(k+1) - V_{bc} \quad (14)$$

that is, it ends after reducing a fixed step $V_{bc}$ from the output voltage $V_{bus}(k+1)$ of the controllable power supply at time k+1.

If the inequality (12) does not hold, then $P_{TP}(k+1) < P_{TP}(k)$. Again, it is determined whether $V_{bus}(k+1) > V_{bus}(k)$ holds or not.

If $V_{bus}(k+1) > V_{bus}(k)$ holds, then:

$$V_{bus}(k+2) = V_{bus}(k+1) - V_{bc} \quad (15)$$

that is, it ends after reducing a fixed step $V_{bc}$ from the output voltage $V_{bus}(k+1)$ of the controllable power supply at time k+1.

If $V_{bus}(k+1) > V_{bus}(k)$ does not hold, then:

$$V_{bus}(k+2) = V_{bus}(k+1) + V_{bc} \quad (16)$$

that is, it ends after adding a fixed step $V_{bc}$ to the output voltage $V_{bus}(k+1)$ of the controllable power supply at time k+1.

Figure 4:
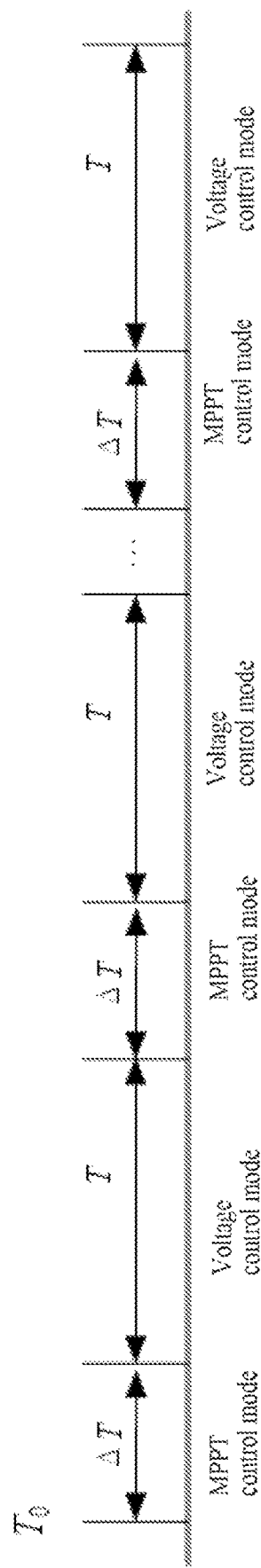
FIG. 4 illustrates the maximum power point tracking (MPPT) control mode of the controllable power supply according to the present invention.

If the controllable power supply has been operating in MPPT mode, then the DC bus voltage $V_{bus}$ contains high-frequency harmonic components. In this case, the embodiment adopts the control method shown in FIG. 4. At the initial moment $T_0$, the controllable power supply runs in MPPT control mode, and switches to the voltage control mode after running in MPPT control mode for a period of time $\Delta T$. After running in the voltage control mode for a period of time T, it switches back to the MPPT control mode, and so on.

The invention claimed is:

1. A method for photovoltaic DC direct-fed power generation, comprising the following steps:
    1) connecting a controllable power supply and a photovoltaic (PV) power generation apparatus to a common DC bus, wherein the PV power generation apparatus is directly connected to the DC bus and does not include maximum power point tracking ability,
       wherein the controllable power supply is operable in both a maximum power tracking control mode and a voltage control mode;
       wherein, in the maximum power tracking control mode, the controllable power source is controlled to regulate the voltage of the DC bus, thereby affecting the maximum power point of the PV power generation apparatus;
       wherein, in the voltage control mode, an overall control block diagram includes a voltage outer loop and a current inner loop;
    2) operating the controllable power source in the maximum power tracking control mode:
    wherein in the step 2), it is first determined whether the following inequality holds or not:

$$P_{CD}(k+1) - P_{CD}(k) < 2\frac{\Delta V V_{bus}}{R_L}$$

where $P_{CD}(k+1)$ and $P_{CD}(k)$ represent the output power of the controllable power supply at time k+1 and k, respectively, $\Delta V$ represents a variation of a DC bus voltage of the controllable power supply, and $R_L$ represents a total power of a DC micro-grid load of the controllable power supply;

if the preceding inequality holds, it is further determined whether the following inequality holds or not:

$$V_{bus}(k+1) > V_{bus}(k)$$

where $V_{bus}(k+1)$ and $V_{bus}(k)$ represent the output voltage of the controllable power supply at time k+1 and k, respectively; if the inequality holds, the output voltage of the controllable power supply increases by one step, otherwise, the output voltage of the controllable power supply decreases by one step,
    3) measuring an output voltage and an output current of the controllable power supply and calculating an output power of the controllable power supply as follows:
    wherein in step 3), the output power of the controllable power supply is an output power $P_{CD}(k)$ at time k, and the output power $P_{CD}(k)$ is calculated according to the following equation:

$$P_{CD}(k) = V_{bus}(k) I_{cd}(k)$$

where $V_{bus}(k)$ and $I_{cd}(k)$ represent the output voltage and output current of the controllable power supply at time k, respectively;
    4) after the expiration of a first predetermined period of time ($\Delta T$), switching the controllable power from the maximum power tracking control mode to the voltage control mode;
    5) After the expiration of a second predetermined period of time (T), switching the controllable power supply back to the maximum power tracking control mode; and
    6) cyclically switching the controllable power supply between the two modes according to $\Delta T$ and T.

2. The method for photovoltaic DC direct-fed power generation based on controllable power supply according to claim 1, wherein in the step 4), the controllable power supply switches to voltage control mode after the maximum power tracking control mode runs for a period of time $\Delta T$, then switches back to the maximum power tracking control mode after the voltage control mode runs for a period of time T, and so on.

3. A method for photovoltaic DC direct-fed power generation, comprising the following steps:
    1) connecting a controllable power supply and a photovoltaic (PV) power generation apparatus to a common DC bus, wherein the PV power generation apparatus is directly connected to the DC bus and does not include maximum power point tracking ability,
       wherein the controllable power supply is operable in both a maximum power tracking control mode and a voltage control mode;
       wherein, in the maximum power tracking control mode, the controllable power source is controlled to regulate the voltage of the DC bus, thereby affecting the maximum power point of the PV power generation apparatus;
       wherein, in the voltage control mode, an overall control block diagram includes a voltage outer loop and a current inner loop;
    2) operating the controllable power source in the maximum power tracking control mode:
    wherein in the step 2), it is first determined whether the following inequality holds or not:

$$P_{CD}(k+1) - P_{CD}(k) < 2\Delta V V_{bus}/R_L$$

where $P_{CD}(k+1)$ and $P_{CD}(k)$ represent the output power of the controllable power supply at time k+1 and k, respectively, $\Delta V$ represents a variation of a DC bus voltage of the controllable power supply, and $R_L$ represents a total power of a DC micro-grid load of the controllable power supply;

if the preceding inequality does not hold, it is further determined whether the following inequality holds or not:

$$V_{bus}(k+1) > V_{bus}(k)$$

where $V_{bus}(k+1)$ and $V_{bus}(k)$ represent the output voltage of the controllable power supply at time k+1 and k, respectively; if the inequality holds, the output voltage of the controllable power supply decreases by one step, otherwise, the output voltage of the controllable power supply increases by one step;

3) measuring an output voltage and an output current of the controllable power supply and calculating an output power of the controllable power supply as follows:

wherein in step 3), the output power of the controllable power supply is an output power $P_{CD}(k)$ at time k, and the output power $P_{CD}(k)$ is calculated according to the following equation:

$$P_{CD}(k) = V_{bus}(k) I_{cd}(k)$$

where $V_{bus}(k)$ and $I_{cd}(k)$ represent the output voltage and output current of the controllable power supply at time k, respectively;

4) after the expiration of a first predetermined period of time ($\Delta T$), switching the controllable power from the maximum power tracking control mode to the voltage control mode;

5) After the expiration of a second predetermined period of time (T), switching the controllable power supply back to the maximum power tracking control mode; and 6) cyclically switching the controllable power supply between the two modes according to $\Delta T$ and T.

\* \* \* \* \*